Aug. 6, 1957 A. J. AFFRUNTI 2,802,056

MULTIPLEX SYSTEM

Filed Aug. 17, 1953 2 Sheets-Sheet 1

INVENTOR
Andrew J. Affrunti
BY
Toorman L. Mueller
ATTY.

Aug. 6, 1957 A. J. AFFRUNTI 2,802,056

MULTIPLEX SYSTEM

Filed Aug. 17, 1953 2 Sheets-Sheet 2

INVENTOR
Andrew J. Affrunti
BY
Norman L. Mueller
ATTY.

United States Patent Office 2,802,056

Patented Aug. 6, 1957

2,802,056

MULTIPLEX SYSTEM

Andrew J. Affrunti, Chicago, Ill., assignor to Motorola, Inc., Chicago, Ill., a corporation of Illinois Application August 17, 1953, Serial No. 374,698

3 Claims. (Cl. 179—15)

This invention relates generally to multiplex systems, and more particularly to such systems wherein party line and dialing facilities are provided in a communication system having a plurality of relay stations.

Multiplex communication systems have been used to provide a plurality of communications over a single channel. Such systems are particularly advantageous for microwave communication as a wide band is available and a plurality of channels may be transmitted within this band. It may be desired to use one or more of these channels in telephone systems wherein partly line and dialing facilities are provided. The pulses controlling ringing and dialing therefore must be transmitted over the system, and it is desired to transmit such control pulses on the same channel as the audio or other basic signals being handled.

In application Serial No. 127,815 filed November 17, 1947, by Kenneth N. Bergan there is disclosed and claimed a system wherein control pulses are transmitted over frequency modulated subcarrier waves by producing a steady shift of the carrier center frequency, and this shift is recovered in the receiver to reproduce the control pulse. This system has been found highly satisfactory. In this system, when it is desired to communicate over a channel from a relay station it is necessary to recover the signals and control pulses on the channel and then retransmit them. This has been satisfactory in systems where only a few repeater or relay stations are provided, and/or in which the individual subcarriers are transmitted through all but a few of the relay stations without being demodulated. However, at stations in which a connection to a channel is required and the subcarrier for that channel must be demodulated and then again modulated and retransmitted, distortion of the signal takes place. This is particularly undesirable for the control pulses since after such a process is repeated a few times, the pulse shape is destroyed and the system will not respond thereto.

It is therefore an object of the present invention to provide an improved multiplex system for use in relay communication systems wherein the signal is brought out at the relay stations.

A further object of this invention is to provide a multiplex system for use in relay communication systems wherein the signal is repeated through the relay stations without demodulation, and is demodulated for reception at the station.

A further object of the invention is the provision of a microwave relay system having a plurality of relay stations and providing two-way party line communications between the stations by using a single channel in each direction, with the quality of communications going through the relay stations on the party line channels being preserved.

A feature of this invention is the provision of a multiplex system including superheterodyne receivers at relay stations for deriving the signals on a channel, with the signals being passed through the relay stations at intermediate frequency level without demodulation so that the signals passed through are not distorted.

Another feature of this invention is the provision of a microwave relay system having channels extending in both directions of the same subcarrier frequency providing party line communication between the stations, and a relay station including a superheterodyne receiver connected to each channel for deriving the signals therefrom and a single transmitter for applying signals in both directions thereto, and with the intermediate frequency signals from both receivers being applied to a mixer in the transmitter to provide a carrier wave path for signals continuing through the relay station so that such signals are not distorted. The transmitter includes an oscillator which may be modulated by signals originating at the relay station so that such signals may be transmitted thereby, and may include an oscillator for providing the intermediate frequency so that transmissions can take place from the relay station in the event of failure of incoming signals.

Other objects, features and the attending advantages of the invention will be apparent from a consideration of the following description when taken in connection with the accompanying drawings, wherein.

In practicing the invention there is provided a relay communication system in which party line telephone communication is provided between the various relay stations. This may be a multiplex system wherein a plurality of channels are provided and one channel in each direction is necessary for two-way party line communication. The various channels are provided by subcarrier waves which are modulated by the signals to be communicated. A plurality of subcarrier waves may be transmitted over a wire line of radio network such as a microwave relay communication system. In order to provide ringing and dialing facilities, pulses must be transmitted as well as the audio or other primary signal. This may be accomplished by using frequency modulation of the subcarrier wave and providing a fixed shift of frequency in response to the control pulses. In order to provide communication at the relay stations the subcarrier must be demodulated thereat and signals originating at the relay station must be used to modulate the subcarrier. However, signals extending through the relay station may be derived from the intermediate frequency amplifier of the superheterodyne subcarrier receiver and applied to a mixer in the transmitter so that the primary signals and control pulses are passed through the relay station on a carrier wave, and are not recovered and then again used as modulating signals. Accordingly, the distortion normally resulting from demodulation is eliminated and the wave shape of both the audio waves and the control pulses are preserved.

Figure 1:
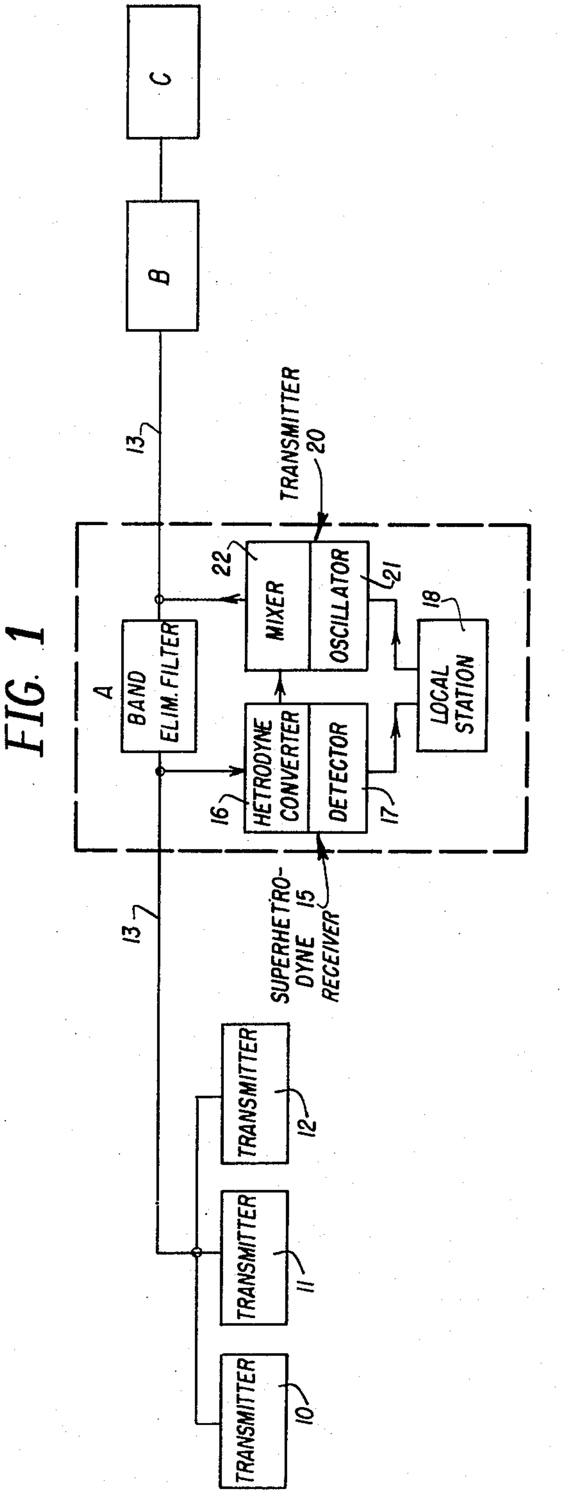
Fig. 1 is a block diagram illustrating the principles of the invention.

Referring now to the drawings, in Fig. 1 there is illustrated a system wherein a plurality of subcarrier transmitters 10, 11 and 12 are connected to a single communication circuit 13 which may be a wire line or a wide band radio channel. The transmitters 10, 11 and 12 operate on different frequencies and may be frequency modulated by three different sources. One of the transmitters, for example, the transmitter 10, may provide telephone service over the circuit 13 and may transmit audio signals and also control pulses.

In order to derive the signals from the transmitter 10 at a repeater station A, a receiver 15 is connected to the circuit 13. The receiver is of the superheterodyne type having a first heterodyne section 16 including a frequency converter and intermediate amplifier and a second detector section 17. The signals from the detector section 17 are applied to a local station 18. As stated above, these signals may include audio or other primary signals and also control signals such as ringing or dialing pulses as required for telephone party line and/or dialing. Signals from the local station may be applied to a transmitter 20 connected to the circuit 13. The transmitter includes two sections, an oscillator section 21, and a mixer section 22. The oscillator section is capable of being frequency modulated by signals from the local station 18; and the signals from the oscillator, and intermediate frequency signals from the receiver 15 are combined in mixer 22 and applied to the circuit 13. Connected in the circuit 13 between the receiver 15 and transmitter 20 is a band elimination filter 23 which prevents direct transmission through the circuit 13 of the subcarrier frequency of the transmitter 10.

The circuit 13 may also be connected to additional stations B and C which may be generally similar to the station A. A signal transmitted from transmitter 10 may therefore be received at all of the stations A, B, and C. For signals to be received at station A, they must, of course, be demodulated by the receiver 15 at this station. However, the signals going on to stations B and C will merely be reduced to intermediate frequency level by the heterodyne section 16 of the receiver 15 and then mixed in the transmitter mixer section 22 and applied back to the circuit 13. Since the signals are not reduced to audio level, no distortion of the signals or control pulses applied therewith will take place. As the subcarrier wave applied to the receiver 15 and the subcarrier wave from the transmitter 20 must be on the same frequency, the oscillator 21 must have a frequency differing from the subcarrier frequency by the intermediate frequency of the receiver. As an example, the subcarrier from the transmitter 10 may be 600 kilocycles and the intermediate frequency of the receiver 15 150 kilocycles. In such case the oscillator 21 may have a frequency of 750 kilocycles so that when this frequency is mixed with the intermediate frequency of 150 kilocycles, the subcarrier frequency of 600 kilocycles may be obtained.

Figure 2:
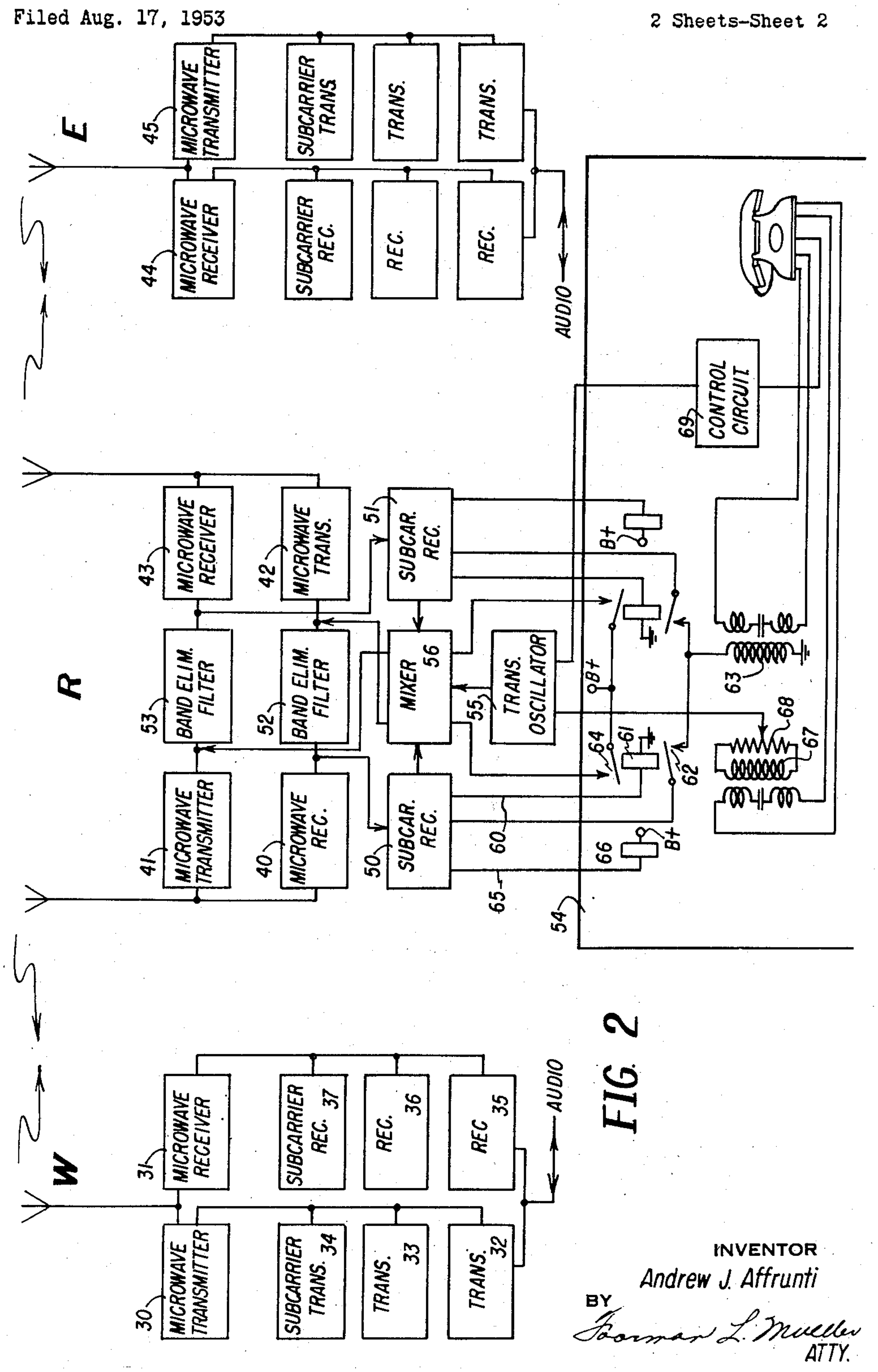
Fig. 2 is a schematic diagram of a microwave relay system in accordance with the invention.

Referring now to Fig. 2 of the drawings, in this figure there is illustrated a microwave relay system utilizing the heterodyne multiplex system in accordance with the invention. There is illustrated a west terminal station W, an east terminal station E, and a relay station R. It is to be pointed out that a plurality of relay stations may be used depending upon the length of the microwave relay system, and the system in accordance with the invention is particularly applicable in instances wherein a plurality of relay stations are provided.

At the station W there is provided a microwave transmitter 30 and a microwave receiver 31. Coupled to the microwave transmitter 30 are a plurality of subcarrier transmitters 32, 33 and 34. Coupled to the microwave receiver 31 are a plurality of subcarrier receivers 35, 36 and 37. The transmitters 32, 33 and 34 operate at different frequencies and the subcarrier waves produced thereby are combined in a single signal applied to the microwave transmitter 30. Similarly, the subcarrier receivers 35, 36 and 37 are adapted to select subcarrier waves of different frequencies from the microwave receiver 31. The receiver frequencies may be the same as the transmitter frequencies or may be different.

The signals transmitted by microwave transmitter 30 of station W are received by the the microwave receiver 40 of relay station R, and the relay station R includes a microwave transmitter 41 which communicates with the microwave receiver 31 at the station W. The relay station R also includes a microwave transmitter 42 and microwave receiver 43 which communicate with the microwave receiver 44 and microwave transmitter 45 respectively of the station E.

Signals received by the microwave receiver 40 which are to be applied directly through the relay station R may be coupled through filter 52 to the microwave transmitter 42 for translation to the station E. Similarly, signals received from the station E by microwave receiver 43, which are to be applied directly through the relay station R, may be coupled through filter 53 to the microwave transmitter 41 for translation to the station W. However, if it is desired to communicate at the relay station R with any of the channels, the subcarrier waves thereof must be received and demodulated at the relay station, and transmissions from the relay station must modulate a subcarrier wave originating thereat.

It will be assumed that the subcarrier waves transmitted by subcarrier transmitters 33 and 34 at station W will be applied directly through relay station R to station E, and that subcarrier waves received by receivers 36 and 37 will be transmitted from the station E directly through the relay station R to the station W. However, communication over the east channel provided by subcarrier transmitter 32, and the west channel received by the subcarrier receiver 35 may be had at the relay station R by the equipment shown. The two channels going in the opposite directions may be provided by the same subcarrier frequency and the subcarrier receivers 50 and 51 at station R will receive the signals in the two directions. The band elimination filters 52 and 53 reject these subcarriers so that they are not applied directly through the relay station.

Signals from the receiver 50, which include audio as well as control signals, are applied to the local station 54 as are also the signals from the receiver 51. Signals originating from the local station 54, including audio as well as control signals, are applied to transmitter oscillator 55 which is coupled to mixer 56 connected to the microwave transmitters 41 and 42 of the relay station R. Accordingly, signals received at the relay station R are demodulated by the receivers and may be heard at the local station. Also, signals originating from the local station will modulate the transmitter oscillator 55 and be applied through the mixer to the microwave transmitters to be transmitted in both directions from the relay station R.

In accordance with the invention there is provided a novel arrangement for applying waves, the signals of which are derived from the system at the station R, through the relay station R between the stations E and W. This is accomplished by deriving the intermediate frequency signals from the receivers 50 and 51 and applying the same to the mixer 56. The transmitter oscillator 55 operates at a frequency which differs from the subcarrier frequency of the channel involved by the intermediate frequency of the receivers. The modulation on the incoming wave remains on the intermediate frequency wave, and the mixer 56 changes the carrier frequency back to the subcarrier frequency of the channel and applies the same modulation to the microwave transmitters. The mixer 56 includes a first portion for combining the intermediate frequency wave from receiver 50 with the oscillations from transmitter oscillator 55 and applying the same to microwave transmitter 42 so that they continue from west to east to station E. The mixer 56 has a second portion for applying signals from receiver 51 to microwave transmitter 41, after the intermediate frequency wave has been mixed with oscillations from transmitter oscillator 55.

Considering a specific example using the frequencies previously mentioned, the microwave transmitter 32 and the microwave receiver 35 may operate at a subcarrier frequency of 600 kilocycles. Accordingly, the receivers 50 and 51 will also be tuned to 600 kilocycles. The receivers 50 and 51 have converters for reducing the received waves to intermediate frequency waves at 150 kilocycles. The transmitter 55 may have a natural frequency of 750 kilocycles, and the mixer 56 has output circuits tuned at 600 kilocycles, so that the 150 kilocycle intermediate frequency applied thereto and the 750 kilocycles oscillations from the transmitter 55 will produce a 600 kilocycle output from the mixer which is applied to the microwave transmitters 41 and 42.

Accordingly, when signals are being applied from either stations E or W over the 600 kilocycle channel, these will be heard at the relay station R. Transmissions may originate at the relay station R since audio waves therefrom modulate the transmitter 55 and these oscillations after being mixed with the intermediate frequency signals from the receivers 50 and 51, are applied by the microwave transmitters to the stations W and E where the receivers will receive the same. The mixer 56 may include an auxiliary oscillator operating at 150 kilocycles so that these oscillations can be mixed with the transmitter frequency of 750 kilocycles to provide the subcarrier frequency of 600 kilocycles, in the event the incoming wave from the receivers 50 and 51 fails. It is therefore apparent that by using this system, a party at any station can talk with parties at any other stations, and conference party line operation can be had over the system.

As originally stated, the control pulses which provide dialing and ringing facilities may be transmitted to the system as fixed shifts of the frequency modulated carrier. Such fixed shifts provide direct current control voltages at the receivers for controlling ringing and other control units. The signals which are applied through a relay station, as from station W to station E, are never demodulated so that the wave form is retained and there is no distortion. Accordingly, a plurality of relay stations may be used with each being connected for communication into a channel on a party line basis, and yet the signals extending through the stations will pass therethrough as modulations of carrier waves rather than as direct audio wherein distortion takes place as is well-known.

In Fig. 2 there is illustrated in a general way the operation of the local station in the party line telephone system. The receiver 50 in addition to providing the audio signals also provides two control signals to the unit. The conductor 60 provides a voltage when a carrier is received by the receiver 50 for energizing relay 61. The relay 61 has contacts 62 which apply the audio from the receiver 50 to the transformer 63 to which the earpiece of the local station hand set is connected. The relay contact 64 energizes the mixer 56 so that the intermediate frequency wave from the receiver 50 is applied through the mixer to the transmitter 42. The receiver 50 also provides on conductor 65 direct current pulses which may be used to energize the relay 66 to provide ringing at the local station. Similar control signals are provided by the receiver 51 for calls coming from the east.

The local station applies signals from the hand set microphone through transformer 67 and volume control resistor 68 to the transmitter 55. Also, D. C. voltages are provided from the local station unit 69 to the transmitter 55, and these pulses may be controlled by dialing or ringing equipment at the local station.

It is to be pointed out that the local station equipment shown in Fig. 2 merely illustrates equipment which may be used. It will be noted that the system permits connection into a channel at a relay station at the audio level, while the signals continuing through the station to the next station in the system are not demodulated but pass through on a carrier wave. Accordingly, the signals are not distorted by the station even though communication is provided from the station.

The heterodyne multiplex system disclosed is particularly applicable in relay systems having a large number of stations. As communication is available over the party line channels from all of the stations in the system, full conference facilities are provided. The equipment required at the relay stations to provide communications into the party line channels is relatively simple. The outgoing mixer may include a local oscillator operating at the intermediate frequency of the receivers so that in the event of failure of incoming signals, by use of the auxiliary oscillator, outgoing signals can still be transmitted at the subcarrier frequencies.

Although one embodiment of the invention has been described which is illustrative thereof, it is obvious that various changes and modifications can be made therein without departing from the intended scope of the invention as defined in the appended claims.

I claim:

1. In a communication system having a plurality of communication channels each formed by a subcarrier wave frequency modulated by a signal and associated control pulses, with the subcarrier waves being combined and applied to a single communication circuit, a relay station on the circuit for relaying all said subcarrier waves and adapted to communicate over at least one of said channels including in combination, superheterodyne receiving means connected to said communication circuit including heterodyne means for selecting one subcarrier wave and reducing the frequency of the same to a predetermined intermediate frequency, and detector means for deriving the modulating signal and control pulses from said intermediate frequency wave, transmitting means including oscillator means and mixer means connected thereto, said oscillator means producing oscillations at a frequency differing from said subcarrier wave by said intermediate frequency, means connecting said superheterodyne receiving means to said mixer means for applying said intermediate frequency wave thereto, said mixer means combining said intermediate frequency wave and said oscillations to produce a subcarrier wave having the same frequency as said one subcarrier wave, said oscillator means being adapted to be modulated by a signal and control pulses at said relay station, said transmitting means including means coupled to said communication circuit for applying said produced subcarrier wave thereto, and band elimination filter means connected in said communication circuit between said receiving means and said transmitting means to prevent direct coupling of said one subcarrier wave frequency therebetween and to apply other subcarrier waves on said communication circuit through said relay station.

2. In a microwave relay system having a plurality of communication channels each formed by a subcarrier wave frequency modulated by a signal and associated control pulses with the subcarrier waves being combined and used to frequency modulate microwave carriers, a relay station for communicating with stations in first and second directions therefrom including in combination, first and second receiving means for receiving microwave carriers from said first and second directions respectively and for deriving said combined waves therefrom, first and second transmitting means for frequency modulating and transmitting microwave carriers in said first and second directions respectively, first and second superheterodyne subcarrier receiving means connected to said first and second microwave receiving means for selecting one subcarrier wave from the combined waves received at the relay station, said subcarrier receiving means including frequency converter and intermediate frequency amplifier means and detector means, and subcarrier transmitting means connected to said first and second microwave transmitting means including oscillator means and mixer means connected thereto, said oscillator means producing oscillations at a frequency differing from said one subcarrier wave by said intermediate frequency, means connecting said intermediate frequency amplifier means of said first and second subcarrier receiving means to said mixer means, said mixer means combining signals from said intermediate frequency amplifier means and said oscillator means to produce a subcarrier wave having the same frequency as said one subcarrier wave, said oscillator means being adapted to be modulated by a signal and control pulses originating at said relay station, and filter means connecting said first microwave receiving means to said second microwave transmitting means and connecting said second microwave receiving means to said first microwave transmitting means for applying all the received subcarrier waves therebetween except said one subcarrier wave.

3. In a microwave relay system having a plurality of communication channels extending in two directions and each formed by a subcarrier wave frequency modulated by a signal, with the subcarrier waves being combined and used to frequency modulate microwave carriers, a relay station for relaying signals between stations in first and second directions therefrom and for communicating on at least one channel in each direction including in combination, first and second receiving means for receiving microwave carriers from said first and second directions respectively and deriving said combined waves from the microwave carriers, first and second transmitting means for frequency modulating and transmitting microwave carriers in said first and second directions respectively, first and second superheterodyne subcarrier receiving means connected respectively to said first and second microwave receiving means for selecting one subcarrier wave from the combined waves received at the relay station from each direction, said subcarrier receiving means including frequency converter and intermediate frequency amplifier means, and detector means for deriving the modulating signal from the intermediate frequency wave, and subcarrier transmitting means including a single oscillator and mixer means having first and second portions connected to said first and second transmitting means, said oscillator means producing oscillations at a frequency differing from said one subcarrier wave by said intermediate frequency, means connecting said oscillator means to said mixer means, means connecting said intermediate frequency amplifier means of said first and second subcarrier receiving means to said second and first portions of said mixer means respectively for producing subcarrier waves having the same frequency as said one subcarrier wave, said oscillator means being adapted to be modulated by a signal originating at said relay station, first filter means for applying waves received by said first microwave receiving means to said second microwave transmitting means, and second filter means for applying waves received from said second microwave receiving means to said first microwave transmitting means, said first and second filter means rejecting the frequency of said one subcarrier wave and passing the frequencies of other subcarrier waves.

References Cited in the file of this patent

UNITED STATES PATENTS

| | | |
|---|---|---|
| 2,421,727 | Thompson | June 3, 1947 |
| 2,477,570 | Berg | Aug. 2, 1949 |
| 2,514,367 | Bond | July 11, 1950 |